(12) United States Patent
Giacoppo et al.

(10) Patent No.: US 12,545,017 B1
(45) Date of Patent: Feb. 10, 2026

(54) PROTECTIVE SHOE COVERING FOR FOOTWEAR AND METHOD FOR MAKING SAME

(71) Applicants: Janna Giacoppo, Burlington, MA (US); Barbara Giacoppo, Boca Raton, FL (US)

(72) Inventors: Janna Giacoppo, Burlington, MA (US); Barbara Giacoppo, Boca Raton, FL (US)

( * ) Notice: Subject to any disclaimer, the term of this patent is extended or adjusted under 35 U.S.C. 154(b) by 17 days.

(21) Appl. No.: 18/222,105

(22) Filed: Jul. 14, 2023

Related U.S. Application Data

(63) Continuation of application No. 16/989,518, filed on Aug. 10, 2020, now abandoned.

(60) Provisional application No. 62/885,281, filed on Aug. 11, 2019.

(51) Int. Cl.
*B32B 27/08* (2006.01)
*B32B 27/30* (2006.01)

(52) U.S. Cl.
CPC ............ *B32B 27/302* (2013.01); *B32B 27/08* (2013.01); *B32B 2274/00* (2013.01); *B32B 2437/02* (2013.01)

(58) Field of Classification Search
CPC ... B32B 25/042; B32B 27/18; B32B 2270/00; B32B 2274/00; B32B 2307/546; B32B 2307/584; A43B 1/0027; A43B 1/0072; A43B 3/16
See application file for complete search history.

(56) References Cited

U.S. PATENT DOCUMENTS

| | | | |
|---|---|---|---|
| 4,335,527 A | 6/1982 | Pask | |
| 6,312,782 B1 | 11/2001 | Goldberg et al. | |
| 2003/0154625 A1* | 8/2003 | Royle | A41B 11/00 36/7.3 |
| 2003/0190442 A1* | 10/2003 | Campbell | A43B 3/16 428/35.2 |
| 2005/0268487 A1 | 12/2005 | Ellis, III | |
| 2007/0289164 A1 | 12/2007 | Liu et al. | |
| 2009/0126223 A1* | 5/2009 | Metzger | A43B 21/42 36/7.1 R |
| 2009/0241369 A1* | 10/2009 | Votolato | A43B 3/16 36/59 R |
| 2011/0078924 A1 | 4/2011 | Rackiewicz | |
| 2017/0318901 A1* | 11/2017 | Nishi | A43B 5/02 |

FOREIGN PATENT DOCUMENTS

| | | | |
|---|---|---|---|
| CN | 201640636 U | * 11/2010 | |
| KR | 2018060564 A | * 6/2018 | ............. A43B 13/12 |

OTHER PUBLICATIONS

Machine translation of KR-2018060564-A, retrieved Sep. 30, 2024. (Year: 2018).*
Teknor Apex—MD 16110, 2018. (Year: 2018).*
Teknor Apex—MD 12337, 2018. (Year: 2018).*
Nevicolor—Medlaist, Sep. 28, 2024. (Year: 2024).*
Machine translation of CN-201640636-U, retrieved Feb. 4, 2025. (Year: 2010).*

* cited by examiner

*Primary Examiner* — Callie E Shosho
*Assistant Examiner* — Krupa Shukla
(74) *Attorney, Agent, or Firm* — The Webb Law Firm

(57) ABSTRACT

The present invention relates to various protective shoe coverings for footwear, and in particular to a protective shoe covering for footwear having a specific set of physical and chemical properties that enable such a protective footwear cover to be clear, long lasting (i.e., able to placed and removed multiple times) and/or flexible. In one embodiment, the present invention relates to a method of making a protective shoe covering for footwear. In another embodiment, the present invention relates to a protective shoe covering for footwear that has a set of specific physical and chemical properties that enable such a protective footwear cover to be clear, long lasting and/or flexible.

14 Claims, No Drawings

PROTECTIVE SHOE COVERING FOR FOOTWEAR AND METHOD FOR MAKING SAME

CROSS REFERENCE TO RELATED APPLICATIONS

The present application is a continuation of and claims priority to U.S. patent application Ser. No. 16/989,518, filed on Aug. 10, 2020, which is a non-provisional of U.S. Provisional Patent Application No. 62/885,281, filed Aug. 11, 2019, the disclosures of which are hereby incorporated herein by reference in their entireties.

FIELD OF THE INVENTION

The present invention relates to various protective shoe coverings for footwear, and in particular to a protective shoe covering for footwear having a specific set of physical and chemical properties that enable such a protective footwear cover to be clear, long lasting (i.e., able to placed and removed multiple times) and/or flexible. In one embodiment, the present invention relates to a method of making a protective shoe covering for footwear. In another embodiment, the present invention relates to a protective shoe covering for footwear that has a set of specific physical and chemical properties that enable such a protective footwear cover to be clear, long lasting and/or flexible.

BACKGROUND OF THE INVENTION

Various prior patents have attempted to provide for protective shoe coverings for women's and/or men's shoes. However, such prior devices disclosed therein suffer from numerous drawbacks including, but not limited to, a lack of clarity in the material used for the main cover portion of the overall protective shoe covering of the shoe, the inability to deal with surfaces that are slippery when wet (i.e., the lack of sufficient traction for the sole portion of a full shoe covering), and/or the lack of the ability to conform to the various geometric shapes and lines of various types of shoe wear while still achieving a long lasting wearable protective shoe covering.

To eliminate these problems, the present invention utilizes an upper portion that is coupled to, or even bonded to, a sole/lower portion where the sole/lower portion of the protective shoe covering of the present invention may optionally include one or more traction and/or tread patterns formed on the bottom surface of the sole/lower portion of the protective shoe covering so as to provide better traction and/or tread on surfaces that are slippery when wet.

SUMMARY OF THE INVENTION

The present invention relates to various protective shoe coverings for footwear, and in particular to a protective shoe covering for footwear having a specific set of physical and chemical properties that enable such a protective footwear cover to be clear, long lasting (i.e., able to placed and removed multiple times) and/or flexible. In one embodiment, the present invention relates to a method of making a protective shoe covering for footwear. In another embodiment, the present invention relates to a protective shoe covering for footwear that has a set of specific physical and chemical properties that enable such a protective footwear cover to be clear, long lasting and/or flexible.

In one embodiment, the present invention relates to a protective shoe covering as described herein. In another embodiment, the present invention relates to a method for making a protective shoe covering as described herein.

In another embodiment, the present invention relates to a protective shoe covering comprising: at least one upper portion formed from a first polymer compound, wherein the first polymer compound is selected from at least one of a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, a styrene-butadiene-styrene block copolymer, a styrene-butadiene-styrene block copolymer-mineral oil combination, or a styrene-butadiene-styrene block copolymer-silicone oil combination, and wherein the first polymer compound has both: (i) an elongation of greater than about 800 percent; and (ii) a tensile modulus at 300 percent in the range of about 20 psi to about 100 psi; and at least one sole/lower portion formed from a second polymer compound, wherein the second polymer compound is selected from at least one of a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, a styrene-butadiene-styrene block copolymer, a styrene-butadiene-styrene block copolymer-mineral oil combination, a styrene-butadiene-styrene block copolymer-silicone oil combination, a styrene-ethylene-butylene-styrene copolymer, a styrene-ethylene-butylene-styrene copolymer-mineral oil combination, or a styrene-ethylene-butylene-styrene copolymer-silicone oil combination, and wherein the second polymer compound has both: (a) an abrasion resistance in the range of about 50 mg loss/1000 cycles to about 750 mg loss/1000 cycles; and (b) a Shore A value in the range of about 25 and about 42, wherein the at least one upper portion is bonded to the at least one sole/lower portion.

In still another embodiment, the present invention relates to a protective shoe covering comprising: at least one upper portion formed from a first polymer compound, wherein the first polymer compound is selected from at least one of a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, a styrene-butadiene-styrene block copolymer, a styrene-butadiene-styrene block copolymer-mineral oil combination, or a styrene-butadiene-styrene block copolymer-silicone oil combination, and wherein the first polymer compound has both: (i) an elongation of greater than about 850 percent; and (ii) a tensile modulus at 300 percent in the range of about 20 psi to about 70 psi; and at least one sole/lower portion formed from a second polymer compound having therein at least one tread pattern, wherein the second polymer compound is selected from at least one of a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, a styrene-butadiene-styrene block copolymer, a styrene-butadiene-styrene block copolymer-mineral oil combination, a styrene-butadiene-styrene block copolymer-silicone oil combination, a styrene-ethylene-butylene-styrene copolymer, a styrene-ethylene-butylene-styrene copolymer-mineral oil combination, or a styrene-ethylene-butylene-styrene copolymer-silicone oil combination, and wherein the second polymer compound has both: (a) an abrasion resistance in the range of about 100 mg loss/1000 cycles to about 700 mg loss/1000 cycles; and (b) a Shore A value in the range of about 26 and about 41, wherein the at least one upper portion is bonded to the at least one sole/lower portion.

In still another embodiment, the present invention relates to a protective shoe covering comprising: at least one upper portion formed from a first polymer compound, wherein the first polymer compound is selected from at least one of a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, a styrene-butadiene-styrene block copolymer, a styrene-butadiene-styrene block copolymer-mineral oil combination, or a styrene-butadiene-styrene block copolymer-silicone oil combination, and wherein the first polymer compound has both: (i) an elongation of greater than about 900 percent; and (ii) a tensile modulus at 300 percent in the range of about 20 psi to about 60 psi; and at least one sole/lower portion formed from a second polymer compound having therein at least one tread pattern, wherein the second polymer compound is selected from at least one of a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, a styrene-butadiene-styrene block copolymer, a styrene-butadiene-styrene block copolymer-mineral oil combination, a styrene-butadiene-styrene block copolymer-silicone oil combination, a styrene-ethylene-butylene-styrene copolymer, a styrene-ethylene-butylene-styrene copolymer-mineral oil combination, or a styrene-ethylene-butylene-styrene copolymer-silicone oil combination, and wherein the second polymer compound has both: (a) an abrasion resistance in the range of about 50 mg loss/1000 cycles to about 750 mg loss/1000 cycles; and (b) a Shore A value in the range of about 32 and about 38, wherein the at least one upper portion is bonded to the at least one sole/lower portion.

In still another embodiment, the present invention could be formed in any shape via molding, injection molding, extrusion molding, casting, or using any other suitable molding and/or casting technique and then subsequently formed into a desired end shape using one or more techniques selected from polymer welding, radio frequency welding, ultrasonic welding, any suitable type of chemical or physical bonding technique, or any other suitable technique to bond a polymer to a polymer.

DETAILED DESCRIPTION OF THE INVENTION

The present invention relates to various protective shoe coverings for footwear, and in particular to a protective shoe covering for footwear having a specific set of physical and chemical properties that enable such a protective footwear cover to be clear, long lasting (i.e., able to placed and removed multiple times) and/or flexible. In one embodiment, the present invention relates to a method of making a protective shoe covering for footwear. In another embodiment, the present invention relates to a protective shoe covering for footwear that has a set of specific physical and chemical properties that enable such a protective footwear cover to be clear, long lasting and/or flexible.

In one embodiment, the present invention relates to various protective shoe coverings for footwear, and in particular to a protective shoe covering for footwear having the ability to be placed on a piece of footwear for an extended amount of time, removed and replaced thereon multiple times, and/or having the ability to protect one or more types of footwear from becoming dirty and/or worn. In another embodiment, the protective shoe covering of the present invention is formed from an upper portion that covers all, or part, of the desired shoe, or shoes. In still another embodiment, the protective shoe covering of the present invention is formed from an upper portion that covers all, or part, of the desired shoe, or shoes, in combination with a sole/lower portion and/or sole/lower portion optionally having one or more traction and/or tread areas formed therein/thereon. In still another embodiment, the protective shoe covering of the present invention is designed to provide a protective shoe covering over athletic footwear, golf or even other specialty oriented sports footwear (e.g., baseball cleats, football cleats, soccer cleats, etc.) by the presence of a flexible sole/lower portion that further optionally has one or more traction and/or tread areas formed therein/thereon. It should be noted that in most instances where the protective shoe covering of the present invention is to be worn for extended periods of time and/or outdoors, the upper portion of the present invention's protective shoe covering has a suitably thick bottom layer that permits the attachment and/or bonding of the upper portion of the present invention to the sole/lower portion of the present invention.

Regarding the material utilized for the upper portion of the protective shoe covering of the present invention, any polymeric material that is visually clear, stretchable, supple and/or sufficiently UV-resistant is used to form the upper portion of the present invention. Suitable materials include, but are not limited to, one or more thermoplastic elastomeric materials. In another embodiment, where the protective shoe covering of the present invention is to be utilized for applications other than women's high-heeled shoes (e.g., children's footwear, men's footwear, other women's footwear, golf shoes, athletic shoes, etc.), the upper portion of the protective shoe covering of the present invention can be formed from any suitable polymeric material whether such material is clear, opaque, or of any desired color or even multi-colored. In still another embodiment, any type of upper portion and/or any type of sole/lower portion according to any embodiment of the present invention can be formed from any type of suitable polymer material disclosed below regardless of whether such material is clear, opaque or any desired combination of colors.

In one instance the present invention offers a protective shoe covering that has an upper portion that possesses a superior amount of elasticity and/or stretchability bonded to a suitably durable and wearable sole/lower portion, where such a sole/lower portion optionally includes one or more traction and/or tread elements formed therein and/or thereon. Thus, while not wishing to be bound to any one or more advantages, the present invention enables a protective shoe covering that has a strong bond between the upper portion and the sole/lower portion that is able to withstand shear forces and thus resists tearing and/or breaks along the interface between the upper portion and the sole/lower portion. Prior to the inventive process below a strong bond between an upper portion and a sole/lower portion eventually caused a tear or break between the two portions of a protective shoe covering since a sole/lower material with much less elongation was being adhered to a very elastic upper material (e.g., one having an elongation of at least about 800 percent). There is a bit of stress/strain on the non-flat surfaces (rounded edge of shoes) so when bonding in that area, the potential for tears increased significantly.

Given the above, the process of the present invention achieved the unexpected by producing a long lasting, wearable, flexible, removable and repositionable protective shoe covering via a novel and inventive production method. In one embodiment of the present invention, the method of producing a protective shoe covering involves dissolving the various polymer compounds utilized for the sole/lower portion and the upper portion in a suitable organic solvent to create a viscous solution and then dip molding (also alternatively spelled moulding) the various portions of the protective shoe covering of the present invention until a desired final product is obtained. In one embodiment, a suitable organic solvent includes, but is not limited to, toluene. By using multiple dip molding runs to create the protective shoe covering of the present invention one is able to achieve a suitable long lasting, wear and tear resistant bond between the sole/lower portion and the upper portion of the protective shoe covering of the present invention. Thus, a suitable long lasting, wear and tear resistant bond between the less elastic, stronger polymer utilized to form the sole/lower portion of the protective shoe covering of the present invention and the highly elastic polymer material utilized to form the upper portion is achieved. As would be appreciated by those of skill in the art, since the upper portion of the protective shoe covering of the present invention is dip molded first, the upper portion actually extends around both the upper and sole/lower portions of a shoe. The sole/lower portion of the protective shoe covering of the present invention is then dip molded over the bottom surface of the initially formed upper portion material. Thus, a bottom surface of the upper portion material actually underlies the sole/lower portion material and may afford the sole/lower portion an increased thickness and durability. In another embodiment, it is possible to purposely cut out the middle of the bottom surface of the upper portion before attaching and/or dipping the sole/lower portion there over.

In some embodiments of the present invention, the sole/lower portion can be applied to the bottom surface the first formed upper portion material so that the sole/lower portion protrudes up around the edges of a shoe-shaped mold to protect the finished product from scuffs around the sides/edges of the shoe, the toe portion of the shoe and/or the back/sides of the shoe above the shoe's heel area. In one embodiment, the polymer for the upper portion and the polymer for the sole/lower portion have been chosen so that they have a strong affinity and ability to bond to one another.

Thus, in one embodiment, with the process described below—a three dip upper process and a two dip sole/lower process—a protective shoe covering so produced is durable enough to wear over a shoe/boot. In another embodiment, the protective shoe covering of the present invention can be produced by one or more extrusion, one or more blow molding and/or one or more injection molding processes. Additionally, the protective shoe covering of the present invention will withstand sand, salt, gravel, etc.

In another embodiment, a hybrid manufacturing process can be utilized to produce a protective shoe covering with one or more traction and/or tread portions, elements or patterns that are either formed in or on or even attached/adhered to the sole/lower portion of the protective shoe covering of the present invention. In still another embodiment, an additional process step in the manufacture of a protective shoe covering in accordance with the present invention is the application of an injection molded sole/lower portion (generally, but not always, formed from the same polymer material used in the dip molding process of the upper portion) to the bottom surface of a dip molded version of the upper portion of a protective shoe covering. Such one or more traction and/or tread portions, elements or patterns, in this embodiment, are only located on the flat portion of the bottom surface of the protective shoe covering of the present invention and are not applied to the sides. In one instance, an extra layer of upper polymer material can be applied to the bottom surface of the upper portion via a dip molding process to the bottom, sides, toe and/or heel to form an additional protective layer to enable the protective shoe covering of the present invention to resist scuffs to the sides, toe and/or heel. Also, this layer of the extra upper portion polymer material applied via a dip molding process provides a foundation to the bottom of the upper portion where the one or more injection molded sole/lower portion and/or one or more traction and/or tread portions, elements or patterns can be, or are, applied. This embodiment enables the production of a protective shoe covering that achieves a higher degree of slip resistance due to the tread design and material being used in the manufacturing process.

The injection molded sole/lower portion and/or one or more traction and/or tread portions, elements or patterns can be applied and/or adhered to the bottom surface of the dip molded upper using a dip molded sole solution. As there is an organic solvent such as toluene in the sole solution, it naturally has a "primer" quality and creates a "roughing up" of the surface of the injection molded sole which is what helps with the bonding of the two surfaces. Using sole dip molding solution which is clear also permits and achieves a clean, clear bond. In another embodiment, it is also possible to use a toluene-adhesive combination to bond a sole/lower portion and/or one or more traction and/or tread portions, elements or patterns to the bottom of a dip molded upper.

In another embodiment, the protective shoe covering (especially in one embodiment, the upper portion thereof) of the present invention can be manufactured using any suitable injection molding method including, but not limited to, injection molding, co-injection molding (e.g., two or more different polymer materials and/or two or more different colors of the same polymer material), blow molding, or any other suitable molding technique to form an upper portion, a sole/lower portion, or even the whole protective shoe covering. Alternatively, if so desired, one can separately injection mold, cast, dip mold, or using any other suitable molding and/or casting technique to form a sole/lower portion, and, if needed, then bond, or attach, via a suitable method, adhesive, or other bonding agent or method the upper portion of the protective shoe covering to the sole/lower portion of the protective shoe covering.

In one embodiment, the present invention (regardless of whether the manufacturing process is dip-based, injection mold-based or even some other type mold-based manufacturing) utilizes two different polymers selected from one or more thermoplastic elastomers (i.e., polymer compounds having thermoplastic elastomeric properties) and/or one or more thermoplastic rubbers to form both the upper portion and the sole/lower portion of a protective shoe covering in accordance with the present invention. The material for the upper portion needs to possess a higher degree of stretchability or elasticity, whereas the material for sole/lower portion material does not need to have such a high degree of elasticity and/or stretchability. This is primarily because the upper portion of the protective shoe covering of the present invention needs to be able to easily stretch over a shoe/boot, be elastic enough to conform to the shape of the shoe and/or durable enough to be placed on and removed multiple times on the shoe and/or boot to be protected.

The sole/lower portion is, in one embodiment, designed to cover the entirety of the bottom of a shoe/boot and generally rises about an inch or so up the toe area, the sides and the back of the shoe/boot. It should be noted that the amount the sole/lower portion rises above onto the upper portion of the shoe/boot is dependent upon shape or style of the shoe/boot to be protected and thus is to be viewed as variable and not solely limited to any one numerical value. Again, the polymer material used to form the sole/lower portion needs to be more durable as it must possess durability and wear resistance so as to permit same to resist wearing and tearing when coming into contact with pavement, sand, dirt, etc. In another embodiment, the polymer material used to form the sole/lower portion also needs to optionally possess more traction and/or tackiness so as to permit more traction and/or slip resistance on wet and/or slippery surfaces than the polymer material used to form the upper portion.

As noted above, the sole/lower portion material needs to have greater durability since it will come in contact with all kinds of materials and conditions. The tradeoff for the sole/lower portion material is a lower elasticity when compared to the polymer material used to form the upper portion. In one embodiment, the two polymer materials used to form the upper portion and the sole/lower portion need to have an affinity for one another as they will be bonded to one another via a suitable bonding material, adhesive, glue or any suitable bonding process (e.g., radio frequency welding, ultrasonic welding, etc.) that can be used to bond the polymer material used to produce the upper to the polymer material used to produce the sole/lower portion. In another embodiment, the polymer material used for the upper portion and the polymer material used for the sole/lower portion do not need to have an affinity for one another so long as a suitable bonding material, adhesive, glue or any suitable bonding process (e.g., radio frequency welding, ultrasonic welding, etc.) that can be used to bond the polymer material used to produce the upper to the polymer material used to produce the sole/lower portion. Although not limited thereto, in one embodiment the materials that are utilized to form the upper portion and the sole/lower portion are in one instance selected to be transparent and waterproof.

Given the above, in one embodiment, the polymer material used to form the upper portion possesses an elongation greater than about 800 percent, greater than about 850 percent, greater than about 900 percent, greater than about 950 percent, greater than about 1000 percent, greater than about 1100 percent, greater than about 1200 percent, greater than about 1300 percent, greater than about 1400 percent, greater than about 1500 percent, greater than about 1600 percent, greater than about 1700 percent, greater than about 1800 percent, greater than about 1900 percent, or even greater than about 2000 percent. This elongation enables the upper portion material to achieve the necessary elasticity and/or stretchability to achieve the goals stated above for the upper portion of the protective shoe covering. Here, as well as elsewhere in the specification and claims, individual numerical values can be combined to form additional and/or non-disclosed ranges.

Given the above, in another embodiment, the polymer material used to form the upper portion possesses a tensile modulus (or tensile stress) at 300 percent (ASTM D412) of at least about 22 psi to achieve the necessary elasticity and/or stretchability to achieve the goals stated above for the upper portion of the protective shoe covering. In one embodiment, the polymer material used to form the sole/lower portion possesses a tensile modulus (or tensile stress) at 300 percent (ASTM D412) of at least about 100 psi and is a less elastic polymer but has an abrasion resistance of about 195 mg loss/1000 cycles (ASTM G195).

In another embodiment, any suitable polymer material described herein, regardless of such a material's Mn, Mw and/or Mz values, can be utilized for the upper portion of the protective shoe covering of the present invention so long as the polymer material used to form the upper portion possesses a tensile modulus at 300 percent (ASTM D412) in the range of about 20 psi to about 100 psi, or in the range of about 22 psi to about 98 psi, or in the range of about 24 psi to about 96 psi, or in the range of about 26 psi to about 94 psi, or in the range of about 28 psi to about 92 psi, or in the range of about 30 psi to about 90 psi, or in the range of about 32 psi to about 88 psi, or in the range of about 34 psi to about 86 psi, or in the range of about 36 psi to about 84 psi, or in the range of about 38 psi to about 82 psi, or in the range of about 40 psi to about 80 psi, or in the range of about 42 psi to about 78 psi, or in the range of about 44 psi to about 76 psi, or in the range of about 46 psi to about 74 psi, or in the range of about 48 psi to about 72 psi, or in the range of about 50 psi to about 70 psi, or in the range of about 52 psi to about 68 psi, or in the range of about 54 psi to about 66 psi, or in the range of about 56 psi to about 64 psi, or in the range of about 58 psi to about 62 psi, or even about 60 psi. Here, as well as elsewhere in the specification and claims, individual numerical values can be combined to form additional and/or non-disclosed ranges.

In another embodiment, any suitable polymer material described herein, regardless of such a material's Mn, Mw and/or Mz values, can be utilized for the sole/lower portion of the protective shoe covering of the present invention so long as the polymer material used to form the sole/lower portion possesses a tensile modulus at 300 percent (ASTM D412) in the range of about 100 psi to about 400 psi, or in the range of about 110 psi to about 390 psi, or in the range of about 120 psi to about 380 psi, or in the range of about 130 psi to about 370 psi, or in the range of about 140 psi to about 360 psi, or in the range of about 150 psi to about 350 psi, or in the range of about 160 psi to about 340 psi, or in the range of about 170 psi to about 330 psi, or in the range of about 180 psi to about 320 psi, or in the range of about 190 psi to about 310 psi, or in the range of about 200 psi to about 300 psi, or in the range of about 210 psi to about 290 psi, or in the range of about 220 psi to about 280 psi, or in the range of about 230 psi to about 270 psi, or in the range of about 240 psi to about 260 psi, or even about 250 psi. Here, as well as elsewhere in the specification and claims, individual numerical values can be combined to form additional and/or non-disclosed ranges.

In another embodiment, any suitable polymer material described herein, regardless of such a material's Mn, Mw and/or Mz values, can be utilized for the sole/lower portion of the protective shoe covering of the present invention so long as the polymer material used to form the sole/lower portion possesses an abrasion resistance in the range of about 50 mg loss/1000 cycles to about 750 mg loss/1000 cycles, or in the range of about 60 mg loss/1000 cycles to about 740 mg loss/1000 cycles, or in the range of about 70 mg loss/1000 cycles to about 730 mg loss/1000 cycles, or in the range of about 80 mg loss/1000 cycles to about 720 mg loss/1000 cycles, or in the range of about 90 mg loss/1000 cycles to about 710 mg loss/1000 cycles, or in the range of about 100 mg loss/1000 cycles to about 700 mg loss/1000 cycles, or in the range of about 110 mg loss/1000 cycles to about 690 mg loss/1000 cycles, or in the range of about 120 mg loss/1000 cycles to about 680 mg loss/1000 cycles, or in the range of about 130 mg loss/1000 cycles to about 670 mg loss/1000 cycles, or in the range of about 140 mg loss/1000 cycles to about 660 mg loss/1000 cycles, or in the range of about 150 mg loss/1000 cycles to about 650 mg loss/1000 cycles, or in the range of about 160 mg loss/1000 cycles to about 640 mg loss/1000 cycles, or in the range of about 170 mg loss/1000 cycles to about 630 mg loss/1000 cycles, or in the range of about 180 mg loss/1000 cycles to about 620 mg loss/1000 cycles, or in the range of about 190 mg loss/1000 cycles to about 610 mg loss/1000 cycles, or in the range of about 200 mg loss/1000 cycles to about 600 mg loss/1000 cycles, or in the range of about 210 mg loss/1000 cycles to about 590 mg loss/1000 cycles, or in the range of about 220 mg loss/1000 cycles to about 580 mg loss/1000 cycles, or in the range of about 230 mg loss/1000 cycles to about 570 mg loss/1000 cycles, or in the range of about 240 mg loss/1000 cycles to about 560 mg loss/1000 cycles, or in the range of about 250 mg loss/1000 cycles to about 550 mg loss/1000 cycles, or in the range of about 260 mg loss/1000 cycles to about 540 mg loss/1000 cycles, or in the range of about 270 mg loss/1000 cycles to about 530 mg loss/1000 cycles, or in the range of about 280 mg loss/1000 cycles to about 520 mg loss/1000 cycles, or in the range of about 290 mg loss/1000 cycles to about 510 mg loss/1000 cycles, or in the range of about 300 mg loss/1000 cycles to about 500 mg loss/1000 cycles, or in the range of about 310 mg loss/1000 cycles to about 490 mg loss/1000 cycles, or in the range of about 320 mg loss/1000 cycles to about 480 mg loss/1000 cycles, or in the range of about 330 mg loss/1000 cycles to about 470 mg loss/1000 cycles, or in the range of about 340 mg loss/1000 cycles to about 460 mg loss/1000 cycles, or in the range of about 350 mg loss/1000 cycles to about 450 mg loss/1000 cycles, or in the range of about 360 mg loss/1000 cycles to about 440 mg loss/1000 cycles, or in the range of about 370 mg loss/1000 cycles to about 430 mg loss/1000 cycles, or in the range of about 380 mg loss/1000 cycles to about 420 mg loss/1000 cycles, or in the range of about 390 mg loss/1000 cycles to about 410 mg loss/1000 cycles, or even about 400 mg loss/1000 cycles (using ASTM G195). Here, as well as elsewhere in the specification and claims, individual numerical values can be combined to form additional and/or non-disclosed ranges.

In another embodiment, any suitable polymer material described herein, regardless of such a material's Mn, Mw and/or Mz values, can be utilized for the sole/lower portion of the protective shoe covering of the present invention so long as the polymer material used to form the sole/lower portion possesses a Shore A via a Durometer value in the range of about 25 and about 42, or in the range of about 26 and about 41, or in the range of about 27 and about 40, or in the range of about 28 and about 39, or in the range of about 29 and about 38, or in the range of about 30 and about 37, or in the range of about 31 and about 36, or in the range of about 32 and about 35, or even in the range of about 33 and about 34, using ASTM D2240 at a testing time of either 5 seconds or 10 seconds of firm contact with a suitable specimen as required by the aforementioned ASTM standard. Here, as well as elsewhere in the specification and claims, individual numerical values can be combined to form additional and/or non-disclosed ranges.

Thus, in one embodiment, the upper polymer material is selected from suitable thermoplastic elastomer polymers including, but not limited to, a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, or a styrene block copolymer (including, but not limited to, any type of thermoplastic elastomer made from a styrene blocks with any one or more other suitable polymer blocks regardless of whether such other blocks are styrenic in nature or not). In one more detailed instance, the upper polymer material is selected from a suitable thermoplastic elastomer polymer including, but not limited to, a styrene block copolymer such as a styrene-butadiene-styrene block copolymer, which can optionally further include either a mineral oil or a silicone oil.

In one embodiment, such polymer materials for the upper portion have bimodal number average (Mn) molecular weights of about 290,000 Daltons and about 107,000 Daltons. Additionally, the weight average (Mw) molecular weight of the polymer materials for the upper portion also are bimodal and are about 313,000 Daltons and about 118,000 Daltons. These numerical values yield a polydispersity of about 1.08 and about 1.10 for the bimodal numbers detailed above.

Furthermore, the z-average (Mz) molecular weight is also determined and is the third moment or third power average molecular weight which is calculated by:

$$\overline{M_z} = \frac{\sum M_i^3 N_i}{\sum M_i^2 N_i}$$

Generally speaking the melt elasticity of a polymer is dependent on Mz molecular weight. In one embodiment, the Mz molecular weight of the polymer materials for the upper portion have bimodal z-average (Mz) molecular weights of about 345,000 Daltons and about 125,000 Daltons.

Given the above, in one embodiment, the sole/lower polymer material is selected from suitable thermoplastic elastomer polymers and/or thermoplastic rubbers including, but not limited to, a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, or a styrene block copolymer (including, but not limited to, any type of thermoplastic elastomer made from a styrene blocks with any one or more other suitable polymer blocks regardless of whether such other blocks are styrenic in nature or not). In one instance, the sole/lower portion polymer material is selected from a suitable thermoplastic elastomer polymers and/or thermoplastic rubbers including, but not limited to, a styrene block copolymer such as a styrene-butadiene-styrene block copolymer which can optionally further include one or more of mineral oil and/or a silicone oil. In one more detailed instance, the sole/lower polymer material is selected from a suitable thermoplastic elastomer polymers and/or thermoplastic rubbers including, but not limited to, a styrene block copolymer such as a styrene-butadiene-styrene block copolymer, which can optionally further include one or more of mineral oil and/or a silicone oil, or a styrene-ethylenebutylene-styrene (SEBS) copolymer (SEBS may be referred to as a triblock copolymer due to the general appreciation of ethylene and butylene blocks as one block where such polymer compounds exhibit both thermoplastic and elastomeric properties and/or both thermoplastic and rubber properties), which can optionally further include either a mineral oil or a silicone oil.

In one embodiment, such polymer materials for the sole/lower portion have bimodal number average (Mn) molecular weights of about 288,000 Daltons and about 105,000 Daltons. Additionally, the weight average (Mw) molecular weight of the polymer materials for the sole/lower portion also are bimodal and are about 316,000 Daltons and about 116,000 Daltons. These numerical values yield a polydispersity of about 1.10 and about 1.10 for the bimodal numbers detailed above.

Furthermore, in one embodiment, the Mz molecular weight of the polymer materials for the sole/lower portion have bimodal z-average (Mz) molecular weights of about 372,000 Daltons and about 124,000 Daltons.

All of the Mw and Mn molecular weight numbers details above are obtained using a gel permeation chromatography (GPC) process via a Waters GPC II Liquid Chromatograph with Model 590 Pump and R401 Differential Refractometer. The method uses standard molecular weight methodology using polystyrene standards and a tetrahydrofuran (THF) solvent. A flow rate of 1.0 ml/minute with 4E and 5E mixed bed columns. The sample preparation is 15 mg to 20 mg samples of each polymer material respectively dissolved in 5 ml of THF.

It should be noted that the polymer materials for the upper portion and the sole/lower portion are not limited solely to polymer materials having the above molecular weight numbers. Rather any of the aforementioned polymer materials listed above can be utilized regardless of their Mw, Mn and/or Mz values so long as such polymer materials: (i) are visually clear and/or (ii) possess an elongation detailed above and/or (iii) possess a tensile modulus detailed above and/or (iv) possess an abrasion resistance detailed above (or even are or possess any two, three or all four of these traits).

Given the above, when a dip molding process is utilized to produce the protective shoe covering of the present invention, the solution for such a dip molding process is made by a mixing the polymer material (be it the polymer material for the upper portion or the polymer material for the sole/lower portion) into a suitable organic solvent such as toluene with a mixer at a low speed. In one embodiment, the dip molding solution for the upper portion of the protective shoe covering of the present invention is formed by combining a suitable upper polymer material selected from those listed above at a weight ratio of about 36 percent upper polymer material to 64 percent solvent (e.g., toluene) so as to produce a mixture having a viscosity of in the range of about 2200 cps to 2600 cps. It should be noted that the present invention is not limited solely to this exemplary mixture ratio of polymer to solvent.

Rather, any suitable mixture of an upper polymer material described herein with a suitable organic solvent described herein to produce a dipping solution thereof having a viscosity in the range of about 1800 cps to about 3000 cps, or in the range of about 1850 cps to about 2950 cps, or in the range of about 1900 cps to about 2900 cps, or in the range of about 1950 cps to about 2850 cps, or in the range of about 2000 cps to about 2800 cps, or in the range of about 2050 cps to about 2750 cps, or in the range of about 2100 cps to about 2700 cps, or in the range of about 2150 cps to about 2650 cps, or in the range of about 2200 cps to about 2600 cps, or in the range of about 2250 cps to about 2550 cps, or in the range of about 2300 cps to about 2500 cps, or in the range of about 2350 cps to about 2450 cps, or even about 2400 cps regardless of such a polymer's Mw, Mn and/or Mz values. Here, as well as elsewhere in the specification and claims, individual numerical values can be combined to form additional and/or non-disclosed ranges. It should be noted that the above viscosity ranges are exemplary in nature and the present invention is not limited thereto.

In another embodiment, the injection molding polymer for the upper portion of the protective shoe covering of the present invention has a viscosity in the range of about 10 cps to about 18000 cps when melted. Alternatively, the viscosity of the polymer for the upper portion has a viscosity, when melted, in the range of about 20 cps to about 18000 cps, or in the range of about 25 cps to about 17500 cps, or in the range of about 30 cps to about 17000 cps, or in the range of about 35 cps to about 16500 cps, or in the range of about 40 cps to about 16000 cps, or in the range of about 45 cps to about 15500 cps, or in the range of about 50 cps to about 15000 cps, or in the range of about 55 cps to about 14500 cps, or in the range of about 60 cps to about 14000 cps, or in the range of about 65 cps to about 13500 cps, or in the range of about 70 cps to about 13000 cps, or in the range of about 75 cps to about 12500 cps, or in the range of about 80 cps to about 12000 cps, or in the range of about 85 cps to about 11500 cps, or in the range of about 90 cps to about 11000 cps, or in the range of about 95 cps to about 10500 cps, or in the range of about 100 cps to about 10000 cps, or in the range of about 110 cps to about 9500 cps, or in the range of about 120 cps to about 9000 cps, or in the range of about 130 cps to about 8500 cps, or in the range of about 140 cps to about 8000 cps, or in the range of about 150 cps to about 7500 cps, or in the range of about 160 cps to about 7000 cps, or in the range of about 170 cps to about 6500 cps, or in the range of about 180 cps to about 6000 cps, or in the range of about 190 cps to about 5500 cps, or in the range of about 200 cps to about 5000 cps, or in the range of about 225 cps to about 4500 cps, or in the range of about 250 cps to about 4000 cps, or in the range of about 300 cps to about 3500 cps, or in the range of about 350 cps to about 3000 cps, or in the range of about 400 cps to about 2500 cps, or in the range of about 450 cps to about 2000 cps, or in the range of about 500 cps to about 1500 cps, or in the range of about 550 cps to about 1000 cps, or in the range of about 600 cps to about 950 cps, or in the range of about 650 cps to about 900 cps, or in the range of about 700 cps to about 850 cps, or in the range of about 750 cps to about 800 cps, or even about 775 cps regardless of such a polymer's Mw, Mn and/or Mz values. Here, as well as elsewhere in the specification and claims, individual numerical values can be combined to form additional and/or non-disclosed ranges. It should be noted that the above viscosity ranges are exemplary in nature and the present invention is not limited thereto.

Given the above, when a dip molding process is utilized to produce the protective shoe covering of the present invention, the solution for such a dip molding process is made by a mixing the polymer material (be it the polymer material for the upper portion or the polymer material for the sole/lower portion) into a suitable organic solvent such as toluene with a mixer at a low speed. In one embodiment, the dip molding solution for the sole/lower portion of the protective shoe covering of the present invention is formed by combining a suitable sole/lower polymer material selected from those listed above at a weight ratio of about 33 percent sole/lower polymer material to 67 percent solvent (e.g., toluene) so as to produce a mixture having a viscosity in the range of about 4000 to about 13000 cps. It should be noted that the present invention is not limited solely to this exemplary mixture ratio of polymer to solvent.

Rather, any suitable mixture of a sole/lower polymer material described herein with a suitable organic solvent described herein to produce a dipping solution thereof having a viscosity in the range of about 2500 cps to about 18000 cps, or in the range of about 3000 cps to about 17500 cps, or in the range of about 3500 cps to about 17000 cps, or in the range of about 4000 cps to about 16500 cps, or in the range of about 4500 cps to about 16000 cps, or in the range of about 5000 cps to about 15500 cps, or in the range of about 5500 cps to about 15000 cps, or in the range of about 6000 cps to about 14500 cps, or in the range of about 6500 cps to about 14000 cps, or in the range of about 7000 cps to about 13500 cps, or in the range of about 7500 cps to about 13000 cps, or in the range of about 8000 cps to about 12500 cps, or in the range of about 8500 cps to about 12000 cps, or in the range of about 9000 cps to about 11500 cps, or in the range of about 9500 cps to about 11000 cps, or even about 10000 cps regardless of such a polymer's Mw, Mn and/or Mz values. Here, as well as elsewhere in the specification and claims, individual numerical values can be combined to form additional and/or non-disclosed ranges. It should be noted that the above viscosity ranges are exemplary in nature and the present invention is not limited thereto.

In another embodiment, the injection molding polymer for the sole/lower portion of the protective shoe covering of the present invention has a viscosity in the range of about 10 cps to about 18000 cps when melted. Alternatively, the viscosity of the polymer for the sole/lower portion has a viscosity, when melted, in the range of about 20 cps to about 18000 cps, or in the range of about 25 cps to about 17500 cps, or in the range of about 30 cps to about 17000 cps, or in the range of about 35 cps to about 16500 cps, or in the range of about 40 cps to about 16000 cps, or in the range of about 45 cps to about 15500 cps, or in the range of about 50 cps to about 15000 cps, or in the range of about 55 cps to about 14500 cps, or in the range of about 60 cps to about 14000 cps, or in the range of about 65 cps to about 13500 cps, or in the range of about 70 cps to about 13000 cps, or in the range of about 75 cps to about 12500 cps, or in the range of about 80 cps to about 12000 cps, or in the range of about 85 cps to about 11500 cps, or in the range of about 90 cps to about 11000 cps, or in the range of about 95 cps to about 10500 cps, or in the range of about 100 cps to about 10000 cps, or in the range of about 110 cps to about 9500 cps, or in the range of about 120 cps to about 9000 cps, or in the range of about 130 cps to about 8500 cps, or in the range of about 140 cps to about 8000 cps, or in the range of about 150 cps to about 7500 cps, or in the range of about 160 cps to about 7000 cps, or in the range of about 170 cps to about 6500 cps, or in the range of about 180 cps to about 6000 cps, or in the range of about 190 cps to about 5500 cps, or in the range of about 200 cps to about 5000 cps, or in the range of about 225 cps to about 4500 cps, or in the range of about 250 cps to about 4000 cps, or in the range of about 300 cps to about 3500 cps, or in the range of about 350 cps to about 3000 cps, or in the range of about 400 cps to about 2500 cps, or in the range of about 450 cps to about 2000 cps, or in the range of about 500 cps to about 1500 cps, or in the range of about 550 cps to about 1000 cps, or in the range of about 600 cps to about 950 cps, or in the range of about 650 cps to about 900 cps, or in the range of about 700 cps to about 850 cps, or in the range of about 750 cps to about 800 cps, or even about 775 cps regardless of such a polymer's Mw, Mn and/or Mz values. Here, as well as elsewhere in the specification and claims, individual numerical values can be combined to form additional and/or non-disclosed ranges. It should be noted that the above viscosity ranges are exemplary in nature and the present invention is not limited thereto.

It should be noted that there is a balance between the amount of polymer and the amount of solvent in the dip molding solution. This ratio is important as it relates to whether or not bubbles form and/or whether or not bubbles are captured during the dip molding process in one or more of the upper portion and/or the sole/lower portion. In some embodiments, bubbles are viewed as detrimental to the clarity and other properties of the upper portion and the sole/lower portion formed by a suitable dip molding process and/or even any suitable molding process. While not wishing to be bound to any one theory, generally speaking a higher amount of polymer in the polymer to solvent mixture yields a dip molding solution with a greater/higher viscosity. This in turn permits a thicker or deeper amount of polymer to be "laid down" during any one dip molding process step. However, with a thicker viscosity, air bubbles have a harder time of escaping the solution throughout the dip molding process. After the viscosity passes a certain level, bubbles can become trapped and since bubbles cannot be removed during the drying stage of the dip molding process an undesirable final product may result. Additionally, the more viscous a dip molding solution is, the more slowly the solvent evaporates during the drying phase. Furthermore, while not wishing to be bound to any one theory, bubble formation during any suitable molding process (e.g., an injection molding process) is also generally viewed as detrimental as such bubbles can lead to undesirable weaknesses in the structure of a molded product produced thereby.

In light of the above, one exemplary dip molding process will be detailed below. It should be understood that the process below for forming the various portions of a protective shoe covering in accordance with the present invention is not to be seen as limiting. Rather, the number of dipping steps for each of the upper portion and sole/lower portion can be individually increased and/or decreased depending on a number of factors including, but not limited to, desired thickness, strength, elasticity, etc. of the final desired protective shoe covering in accordance with the present invention.

Exemplary Dipping Process:

Given the above, in the dip molding process described below the upper polymer material is selected from a styrene-butadiene polymer-oil combination having bimodal number average (Mn) molecular weights of about 290,000 Daltons and about 107,000 Daltons. Additionally, the weight average (Mw) molecular weight of this polymer material for the upper portion is also bimodal and are about 313,000 Daltons and about 118,000 Daltons. These numerical values yield a polydispersity of about 1.08 and about 1.10 for the bimodal numbers detailed above. Furthermore, the Mz molecular weight of the polymer material for the upper portion have bimodal z-average (Mz) molecular weights of about 345,000 Daltons and about 125,000 Daltons. Also, the solution for the upper portion dip molding process for the exemplary process detailed below is made by a mixing the upper polymer material into toluene at a weight ratio of about 36 percent upper polymer material to 64 percent toluene so as to produce a mixture having a viscosity of about 2200 cps.

Given the above, in the dip molding process described below the sole/lower polymer material is selected from a styrene-butadiene polymer-silicone oil combination having bimodal number average (Mn) molecular weights of about 288,000 Daltons and about 105,000 Daltons. Additionally, the weight average (Mw) molecular weight of the polymer material for the sole/lower portion is also bimodal and are about 316,000 Daltons and about 116,000 Daltons. These numerical values yield a polydispersity of about 1.10 and about 1.10 for the bimodal numbers detailed above. Furthermore, the Mz molecular weight of the polymer material for the sole/lower portion have bimodal z-average (Mz) molecular weights of about 372,000 Daltons and about 124,000 Daltons. Also, the solution for the sole/lower portion dip molding process for the exemplary process detailed below is made by a mixing the sole/lower polymer material into toluene at a weight ratio of about 33 percent upper polymer material to 67 percent toluene so as to produce a mixture having a viscosity of about 8500 cps.

It should also be noted, that while exemplary dipping parameters are detailed below (such as the various dipping angles for the molds and/or other dipping parameters), the process detailed below is not limited solely thereto.

First Dip for the Upper Portion:

Initially, the mandrel (i.e., the shoe-shaped mold) is cleaned with isopropyl alcohol and then the mandrel/mold is placed on a dipping machine. Next, using a suitable designed computer program the mandrel/mold is dipped into a bath containing an upper polymer solution in accordance with the one described above. The mandrel/mold is dipped at an angle toe first of about 32 degrees to eliminate bubble formation from the mold entering the solution. It should be noted that the dipping angle and dipping time are not solely limited to just the above values. Rather, any suitable dipping angle and/or dipping times can be utilized and generally depends on the geometry of the mandrel/mold, the viscosity of the dipping solution, the temperature of the dipping solution, and/or other factors.

Next, the mandrel/mold is straightened out so as to end up in a horizontal orientation under the solution and is slowly lowered deeper into the solution depending upon the height on the ankle required. In this step the total time in the dipping solution is in the range of about 1 second to about 20 seconds. Thereafter, the mandrel/mold is slowly raised out of the dipping solution in a vertical upward direction, the excess dipping solution is permitted to run off the mandrel/mold, and then the mandrel/mold is rocked back and forth (+20 degree angle) slowly to allow any remaining excess polymer material to drip off and back into the dipping tank and to "even out" and/or redistribute the polymer material on the mandrel/mold. Additionally, the mandrel/mold is rocked slowly back and forth to allow the polymer material to move around the mold so as to prevent the formation of dense or heavy globs. During this rocking, the first upper dipping layer is setting up and thus needs to be rocked so that the dipped polymer material forms as uniform a first layer as possible during this setting phase.

Next, the mandrel/mold is then slowly rotated in a clockwise manner for 180 degrees and held upside down for 10 seconds. Next the mandrel/mold is then slowly rotated in a counter-clockwise manner for 900 degrees, remains stationary for 2 seconds and then reversed and rotated clockwise for 900 degrees, remaining stationary for 2 seconds. Thereafter, there is a final 360 degree counter-clockwise rotation of the mandrel/mold with a 2 second stationary hold and then a final 360 degree clockwise rotation of the mold with a 2 second stationary hold. Once this overall first dip for the upper portion is completed (generally it is about 6 minutes and 30 seconds in total length, although the present process is not limited thereto), it is removed from the dipping machine and placed upside down (sole facing ceiling) and permitted to air dry for about 45 seconds to about 60 seconds. The mandrel/mold is then reversed and allowed to air dry with sole facing floor for another about 45 seconds to about 60 seconds. Next, the mandrel/mold is placed in an oven for about 40 minutes at 50° C. and then thereafter fanned so as to cool mandrel/mold down to about 26° C. to about 30° C. (or about 80° F. to about 86° F.).

Second Dip for the Upper Portion:

The mandrel/mold having the first upper portion dip layer is placed on the dipping machine. Next, using a suitable designed computer program the mandrel/mold is dipped a second time into a bath containing an upper polymer solution in accordance with the one described above. The mandrel/mold is dipped at an angle toe first of about 32 degrees to eliminate bubble formation from the mold entering the solution. It should be noted that the dipping angle and dipping time are not solely limited to just the above values. Rather, any suitable dipping angle and/or dipping times can be utilized and generally depends on the geometry of the mandrel/mold, the viscosity of the dipping solution, the temperature of the dipping solution, and/or other factors.

Next, the mandrel/mold is straightened out so as to end up in a horizontal orientation under the solution and is slowly lowered deeper into the solution depending upon the height on the ankle required. In this step the total time in the dipping solution is in the range of about 1 second to about 20 seconds. Thereafter, the mandrel/mold is slowly raised out of the dipping solution in a vertical upward direction, the excess dipping solution is permitted to run off the mandrel/mold, and then the mandrel/mold is rocked back and forth (+20 degree angle) slowly to allow any remaining excess polymer material to drip off and back into the dipping tank and to "even out" and/or redistribute the polymer material on the mandrel/mold. Additionally, the mandrel/mold is rocked slowly back and forth to allow the polymer material to move around the mold so as to prevent the formation of dense or heavy globs. During this rocking, the second upper dipping layer is setting up and thus needs to be rocked so that the dipped polymer material forms as uniform a second layer as possible during this setting phase.

Next, the mandrel/mold is then slowly rotated in a clockwise manner for 180 degrees and held upside down for 10 seconds. Next the mandrel/mold is then slowly rotated in a counter-clockwise manner for 900 degrees, remains stationary for 2 seconds and then reversed and rotated clockwise for 900 degrees, remaining stationary for 2 seconds. Thereafter, there is a final 360 degree counter-clockwise rotation of the mandrel/mold with a 2 second stationary hold and then a final 360 degree clockwise rotation of the mold with a 2 second stationary hold. Once this overall second dip for the upper portion is completed (generally it is about 6 minutes and 30 seconds in total length, although the present process is not limited thereto), it is removed from the dipping machine and placed upside down (sole facing ceiling) and permitted to air dry for about 45 seconds to about 60 seconds. The mandrel/mold is then reversed and allowed to air dry with sole facing floor for another about 45 seconds to about 60 seconds. Next, the mandrel/mold is placed in an oven for about 40 minutes at 50° C. and then thereafter fanned so as to cool mandrel/mold down to about 26° C. to about 30° C. (or about 80° F. to about 86° F.).

Third Dip for the Upper Portion:

The mandrel/mold having the first and second upper portion dip layers is placed on the dipping machine. Next, using a suitable designed computer program the mandrel/ mold is dipped a third time into a bath containing an upper polymer solution in accordance with the one described above. The mandrel/mold is dipped at an angle toe first of about 32 degrees to eliminate bubble formation from the mold entering the solution. It should be noted that the dipping angle and dipping time are not solely limited to just the above values. Rather, any suitable dipping angle and/or dipping times can be utilized and generally depends on the geometry of the mandrel/mold, the viscosity of the dipping solution, the temperature of the dipping solution, and/or other factors.

Next, the mandrel/mold is straightened out so as to end up in a horizontal orientation under the solution and is slowly lowered deeper into the solution depending upon the height on the ankle required. In this step the total time in the dipping solution is in the range of about 1 second to about 20 seconds. Thereafter, the mandrel/mold is slowly raised out of the dipping solution in a vertical upward direction, the excess dipping solution is permitted to run off the mandrel/mold, and then the mandrel/mold is rocked back and forth (+20 degree angle) slowly to allow any remaining excess polymer material to drip off and back into the dipping tank and to "even out" and/or redistribute the polymer material on the mandrel/mold. Additionally, the mandrel/mold is rocked slowly back and forth to allow the polymer material to move around the mold so as to prevent the formation of dense or heavy globs. During this rocking, the third upper dipping layer is setting up and thus needs to be rocked so that the dipped polymer material forms as uniform a third layer as possible during this setting phase.

Next, the mandrel/mold is then slowly rotated in a clockwise manner for 180 degrees and held upside down for 10 seconds. Next the mandrel/mold is then slowly rotated in a counter-clockwise manner for 900 degrees, remains stationary for 2 seconds and then reversed and rotated clockwise for 900 degrees, remaining stationary for 2 seconds. Thereafter, there is a final 360 degree counter-clockwise rotation of the mandrel/mold with a 2 second stationary hold and then a final 360 degree clockwise rotation of the mold with a 2 second stationary hold. Once this overall third dip for the upper portion is completed (generally it is about 6 minutes and 30 seconds in total length, although the present process is not limited thereto), it is removed from the dipping machine and placed upside down (sole facing ceiling) and permitted to air dry for about 45 seconds to about 60 seconds. The mandrel/mold is then reversed and allowed to air dry with sole facing floor for another about 45 seconds to about 60 seconds. Next, the mandrel/mold is placed in an oven for about 60 minutes at 50° C. and then thereafter fanned so as to cool mandrel/mold down to about 26° C. to about 30° C. (or about 80° F. to about 86° F.).

It should be noted that the process of the present invention is not to be construed as limited to three upper dipping steps. Rather, any number of dipping steps from 1 to 10 upper dipping steps can be utilized in order to achieve a desired thickness for the upper portion layer (which as noted above extends around the both the upper portion and the sole/lower portion of the shoe-shaped mandrel/mold). It should be appreciated that with a polymer solution having a lower viscosity more dipping steps may be needed to achieve the desired upper thickness level. Conversely, it should be appreciated that with a polymer solution having a higher viscosity less dipping steps may be needed to achieve the desired upper thickness level. However, as noted above, the viscosity of the upper polymer dipping solution needs to be chosen such that is permits the elimination and/or a suitable level of bubble reduction in the final upper polymer portion.

First Dip for the Sole/Lower Portion:

The mandrel/mold having the three upper portion dip layers is placed on the dipping machine. Next, using a suitable designed computer program the mandrel/mold is dipped a first time into a bath containing a sole/lower polymer solution in accordance with the one described above. The mandrel/mold is dipped at an angle heel first of about 10 degrees to eliminate bubble formation from the mandrel/mold entering the solution. This is done as the sole/lower portion is designed to cover the rim of the shoe to protect from scuffs on the sides. Since the sole/lower portion polymer material is generally selected so that it possesses a higher degree of wear and/or abrasion resistance, it is more suitable in providing a desired level of abrasion resistance and/or scuff resistance the sole/lower portion in order to achieve a wearable protective shoe covering. Only a small portion of the mandrel/mold is dipped into the sole/lower solution unlike the dipping steps that are used to form the one or more upper portion polymer layers. The mandrel/mold is then rotated counter-clockwise to cover the toe portion before being straightened, or flattened, out so as to end up in a horizontal orientation so that the mandrel/mold is substantially horizontal in the dipping solution bath/tank. The mandrel/mold is then lowered slightly (depends on how high you want to bring the side coverage) to cover the sides evenly. It should be noted that the dipping angle and dipping time are not solely limited to just the above values. Rather, any suitable dipping angle and/or dipping times can be utilized and generally depends on the geometry of the mandrel/mold, the viscosity of the dipping solution, the temperature of the dipping solution, and/or other factors.

Thereafter, the mandrel/mold is slowly raised out of the dipping solution in a vertical upward direction and permitted to hang over the dipping tank for about 8 seconds to allow excess polymer material to drip off and back into the dipping tank. Next the mandrel/mold is raised, then rotated 20 degrees and then optionally further raised to sufficiently clear the tank. Thereafter, the mandrel/mold is rocked slowly back and forth 5 times at +45 degrees to allow the polymer material to move around the sole portion and not glob. During this rocking, the first sole dipping layer is setting up and thus needs to be rocked so that the dipped polymer material forms as uniform a first layer as possible during this setting phase.

Next, the mandrel/mold is then slowly rotated in a clockwise manner for 360 degrees and then reversed and rotated counter-clockwise for 360 degrees. Thereafter, there is a final 1440 degree clockwise rotation of the mandrel/mold and then a final 1440 degree counter-clockwise rotation of the mold. Once this overall first dip for the sole/lower is completed (generally it is about 5 minutes in total length, although the present process is not limited thereto), it is removed from the dipping machine and placed upside down (sole facing ceiling) and permitted to air dry for about 30 seconds to about 60 seconds. The mandrel/mold is then reversed and allowed to air dry with sole facing floor for another about 30 seconds to about 120 seconds. Next, the mandrel/mold is placed in an oven for about 40 minutes to about 60 minutes at 50° C. and then thereafter fanned so as to cool mandrel/mold down to about 26° C. to about 30° C. (or about 80° F. to about 86° F.).

Second Dip for the Sole/Lower Portion:

The mandrel/mold having the three upper portion dip layers and the one sole/lower portion dip layer is placed on the dipping machine. Next, using a suitable designed computer program the mandrel/mold is dipped a second time into a bath containing an upper polymer solution in accordance with the one described above. The mandrel/mold is dipped at an angle heel first of about 10 degrees to eliminate bubble formation from the mandrel/mold entering the solution. This is done as the sole/lower portion is designed to cover the rim of the shoe to protect from scuffs on the sides. Since the sole/lower portion polymer material is generally selected so that it possesses a higher degree of wear and/or abrasion resistance, it is more suitable in providing a desired level of abrasion resistance and/or scuff resistance the sole/lower portion in order to achieve a wearable protective shoe covering. Only a small portion of the mandrel/mold is dipped into the sole/lower solution unlike the dipping steps that are used to form the one or more upper portion polymer layers. The mandrel/mold is then rotated counter-clockwise to cover the toe portion before being straightened, or flattened, out so as to end up in a horizontal orientation so that the mandrel/mold is substantially horizontal in the dipping solution bath/tank. The mandrel/mold is then lowered slightly (depends on how high you want to bring the side coverage) to cover the sides evenly. It should be noted that the dipping angle and dipping time are not solely limited to just the above values. Rather, any suitable dipping angle and/or dipping times can be utilized and generally depends on the geometry of the mandrel/mold, the viscosity of the dipping solution, the temperature of the dipping solution, and/or other factors.

Thereafter, the mandrel/mold is slowly raised out of the dipping solution in a vertical upward direction and permitted to hang over the dipping tank for about 8 seconds to allow excess polymer material to drip off and back into the dipping tank. Next the mandrel/mold is raised, then rotated 20 degrees and then optionally further raised to sufficiently clear the tank. Thereafter, the mandrel/mold is rocked slowly back and forth 5 times at +45 degrees to allow the polymer material to move around the sole portion and not glob. During this rocking, the second sole dipping layer is setting up and thus needs to be rocked so that the dipped polymer material forms as uniform a second layer as possible during this setting phase.

Next, the mandrel/mold is then slowly rotated in a clockwise manner for 360 degrees and then reversed and rotated counter-clockwise for 360 degrees. Thereafter, there is a final 1440 degree clockwise rotation of the mandrel/mold and then a final 1440 degree counter-clockwise rotation of the mold. Once this overall second dip for the sole/lower is completed (generally it is about 5 minutes in total length, although the present process is not limited thereto), it is removed from the dipping machine and placed upside down (sole facing ceiling) and permitted to air dry for about 30 seconds to about 60 seconds. The mandrel/mold is then reversed and allowed to air dry with sole facing floor for another about 30 seconds to about 120 seconds. Next, the mandrel/mold is placed in an oven for about 40 to about 120 minutes at 50° C. and then thereafter fanned so as to cool mandrel/mold down to about 26° C. to about 30° C. (or about 80° F. to about 86° F.).

It should be noted that the process of the present invention is not to be construed as limited to two sole/lower dipping steps. Rather, any number of dipping steps from 1 to 10 sole/lower dipping steps can be utilized in order to achieve a desired thickness for the sole/lower portion layer (which as noted above may or can extend around the both the upper portion and the sole/lower portion of the shoe-shaped mandrel/mold). It should be appreciated that with a polymer solution having a lower viscosity more dipping steps may be needed to achieve the desired sole/lower portion thickness level. Conversely, it should be appreciated that with a polymer solution having a higher viscosity less dipping steps may be needed to achieve the desired sole/lower portion thickness level. However, as noted above, the viscosity of the sole/lower polymer dipping solution needs to be chosen such that is permits the elimination and/or a suitable level of bubble reduction in the final sole/lower portion.

Exemplary Injection Molding Method:

In another embodiment, the protective shoe covering of the present invention is made using any suitable molding (also alternatively spelled moulding) method such as, but not limited to, injection molding, co-injection molding (e.g., two or more different polymer materials and/or two or more different colors of the same polymer material), blow molding, or any other suitable molding technique. In one instance the previously described upper portion of the protective shoe covering of the present invention can be made from any suitable molding method known to those of skill in the art. In another instance both the previously described upper portion and the sole/lower portion of the protective shoe covering can be made from any suitable molding method known to those of skill in the art. In still another instance, the previously described upper portion of the protective shoe covering of the present invention can be made from any suitable molding method known to those of skill in the art, while the sole/lower portion of the protective shoe covering can be made from any suitable molding method including, but not limited to, any suitable injection molding method, any suitable casting method, any suitable molding method (e.g., dip molding or cast molding), and then subsequently bonded to, or attached to, via a suitable method, adhesive, or other bonding agent or method to the upper portion of the protective shoe covering of the present invention.

Next an exemplary injection molding process will be described for manufacturing the upper portion of the protective shoe covering of the present invention and an exemplary injection molding process will be described for manufacturing the sole/lower portion of the protective shoe covering. It should be noted that these process are to be construed as non-limiting in nature.

Injection Molding Process for Upper Portion:

In one embodiment, the upper portion of the protective shoe covering of the present invention is made using a mold-based injection molding process on a suitably sized injection molding machine (e.g., a 50 ton, a 100 ton, a 200 ton, a 300 ton, or even an injection molding machine having a "higher" amount of tonnage) using a styrene block copolymer comparable to one from Teknor Apex Co. sold under the designation Monprene® MP-1900 having the following properties: density/specific gravity 0.870 (via ASTM D792); a melt mass-flow rate (MFR) (125° C./2.16 kg) 8.0 g/10 min (via ASTM D1238); a tensile stress (Die C, 20 in/min) via ASTM D412 across flow at 100% strain of 14.0 psi and flow at 100% strain of 14.0 psi; tensile stress (Die C, 20 in/min) via ASTM D412 across flow at 300% strain of 23.0 psi and flow at 300% strain of 22.0 psi; tensile strength (Die C, 20 in/min) via ASTM D412 across flow at break of 306 psi and flow at break of 312 psi; tensile elongation (Die C, 20 in/min) via ASTM D412 across flow at break >1000% and flow at break >1000%; tear strength (Die C, 20 in/min) via ASTM D624 across flow of 39.0 lbf/in and flow of 32.0 lbf/in; compression set (type 1) (73° F., 22 hours) of 41% via ASTM D395B; and durometer hardness via ASTM D2240-Shore A, 1 sec, injection molded is 7; Shore OO, 1 sec, injection molded is 50; and Shore OO, 5 sec, injection molded is 48.

Teknor Apex Co. Monprene® MP-1900 has the following general processing parameters when using a suitable injection molding machine (e.g., a 50 ton, a 100 ton, a 200 ton, a 300 ton, or even an injection molding machine having a "higher" amount of tonnage): a rear temperature of about 300° F. to about 360° F.; a middle temperature of about 300° F. to about 360° F.; a front temperature of about 300° F. to about 360° F.; a nozzle temperature of about 300° F. to about 360° F.; a processing (melt) temperature of about 300° F. to about 360° F.; a mold temperature of about 60° F. to about to 90° F.; an injection pressure of about 200 psi to about 800 psi; an injection rate that is stated to be fast; a back pressure of about 25.0 psi to about 100 psi; a screw speed of about 50 rpm to about 100 rpm; and a cushion of about 0.150 inches to about 1.00 inches. Generally, drying is not necessary prior to molding the Monprene® MP-1900. However, if moisture is a problem, dry the polymer pellets for about 2 hours to about 4 hours at about 150° F. (about 65° C.). Extrusion parameters are generally as follows for the Monprene® MP-1900: cylinder zone 1 Temperature is about 280° F. to about 340° F.; cylinder zone 2 Temperature is about 280° F. to about 340° F.; cylinder zone 3 Temperature is about 280° F. to about 340° F.; cylinder zone 4 Temperature is about 280° F. to about 340° F.; cylinder zone 5 Temperature is about 280° F. to about 340° F.; die temperature is about 280° F. to about 340° F.; and the screw speed is about 30 rpm to about 100 rpm.

In another embodiment, the upper portion of the protective shoe covering of the present invention is made using a mold-based injection molding process on a suitably sized injection molding machine (e.g., a 50 ton, a 100 ton, a 200 ton, a 300 ton, or even an injection molding machine having a "higher" amount of tonnage) using a styrene block copolymer comparable to one from Teknor Apex Co. sold under the designation Medalist® MD-16110 having the following properties: density/specific gravity 0.842 (via ASTM D792); a melt mass-flow rate (MFR) (190° C./2.16 kg) 21 g/10 min (via ASTM D1238); a tensile stress (Die C, 20 in/min) via ASTM D412 (100% strain) of 20.0 psi; a tensile stress (Die C, 20 in/min) via ASTM D412 (300% strain) of 30.0 psi; a tensile strength at break (Die C, 20 in/min) via ASTM D412 of 800 psi; a tensile elongation at break (Die C, 20 in/min) via ASTM D412 of 1300%; a tear strength (Die C, 20 in/min) via ASTM D624 of 98.0 lbf/in; a compression set (type 1) (73° F., 23 hours) of 21% via ASTM D395B; and a durometer hardness via ASTM D2240-Shore A, 1 sec, injection molded is 11; and Shore A, 5 sec, injection molded is 9.

Teknor Apex Co. Medalist® MD-16110 has the following general processing parameters when using a suitable injection molding machine (e.g., a 50 ton, a 100 ton, a 200 ton, a 300 ton, or even an injection molding machine having a "higher" amount of tonnage): a rear temperature of about 300° F. to about 320° F.; a middle temperature of about 320° F. to about 350° F.; a front temperature of about 350° F. to about 380° F.; a nozzle temperature of about 350° F. to about 390° F.; a processing (melt) temperature of about 350° F. to about 390° F.; a mold temperature of about 60° F. to about to 100° F.; an injection rate that is stated to be slow-moderate; a back pressure of about 25.0 psi to about 100 psi; and a cushion of about 0.150 inches to about 1.00 inches. Generally, drying is not necessary prior to molding the Medalist® MD-16110. However, if moisture is a problem, dry the polymer pellets for about 2 hours to about 4 hours at about 150° F. (about 65° C.).

In another embodiment, the upper portion of the protective shoe covering of the present invention is made using a mold-based injection molding process on a suitably sized injection molding machine (e.g., a 50 ton, a 100 ton, a 200 ton, a 300 ton, or even an injection molding machine having a "higher" amount of tonnage) using a styrene block copolymer comparable to one from Teknor Apex Co. sold under the designation Monprene® SP-16110 BT XRD1 having the following properties: density/specific gravity 0.860 (via ASTM D792); a melt mass-flow rate (MFR) (190° C./2.16 kg) 21 g/10 min (via ASTM D1238); a tensile stress (Die C, 20 in/min) via ASTM D412 (50% strain) of 21.8 psi; a tensile stress (Die C, 20 in/min) via ASTM D412 (100% strain) of 29.0 psi; a tensile stress (Die C, 20 in/min) via ASTM D412 (300% strain) of 49.3 psi; a tensile strength at break (Die C, 20 in/min) via ASTM D412 of 748 psi; a tensile elongation at break (Die C, 20 in/min) via ASTM D412 of 1300%; a tear strength (Die C, 20 in/min) via ASTM D624 of 100 lbf/in; a compression set (type 1) (73° F., 22 hours) of 13% via ASTM D395B; and a durometer hardness via ASTM D2240—Shore A, 1 sec, injection molded is 11; and Shore A, 5 sec, injection molded is 9.

Teknor Apex Co. Monprene® SP-16110 BT XRD1 has the following general processing parameters when using a suitable injection molding machine (e.g., a 50 ton, a 100 ton, a 200 ton, a 300 ton, or even an injection molding machine having a "higher" amount of tonnage): a rear temperature of about 285° F. to about 320° F.; a middle temperature of about 305° F. to about 340° F.; a front temperature of about 340° F. to about 375° F.; a nozzle temperature of about 330° F. to about 375° F.; a processing (melt) temperature of about 330° F. to about 375° F.; a mold temperature of about 60° F. to about to 100° F.; an injection rate that is stated to be slow-moderate; a back pressure of about 25.0 psi to about 100 psi; a screw speed of about 50 rpm to about 100 rpm; and a cushion of about 0.150 inches to about 0.500 inches. Generally, drying is not necessary prior to molding the Monprene® SP-16110 BT XRD1. However, if moisture is a problem, dry the polymer pellets for about 2 hours to about 4 hours at about 150° F. (about 65° C.).

It should be noted that the present invention is not limited to just the above mentioned polymers, but rather can use any polymer composition that meets one or more of the various chemical and/or physical properties detailed above for the upper portion. As noted above suitable thermoplastic elastomer polymers include, but are not limited to, one or more styrene-butadiene polymers, one or more styrene-butadiene block copolymers, one or more styrene-butadiene polymer-mineral oil combinations, one or more styrene-butadiene block copolymer-mineral oil combinations, one or more styrene-butadiene polymer-silicone oil combinations, one or more styrene-butadiene block copolymer-silicone oil combinations, or one or more styrene block copolymers (including, but not limited to, any type of thermoplastic elastomer made from a styrene blocks with any one or more other suitable polymer blocks regardless of whether such other blocks are styrenic in nature or not), or any suitable combination of two or more of the above.

Injection Molding Process for Sole/Lower Portion

In one embodiment, the sole/lower portion of the protective shoe covering of the present invention is made using a mold-based injection molding process on a suitably sized injection molding machine (e.g., a 50 ton, a 100 ton, a 200 ton, a 300 ton, or even an injection molding machine having a "higher" amount of tonnage) using a styrene block copolymer comparable to one from Teknor Apex Co. sold under the designation Monprene® SP-15930 XRD1 having the following properties: density/specific gravity 1.04 (via ASTM D792); a melt mass-flow rate (MFR) (230° C./5 kg)

4.0 g/10 min (via ASTM D1238); a tensile stress (Die C, 20 in/min) via ASTM D412 (100% strain) of 110 psi; a tensile stress (Die C, 20 in/min) via ASTM D412 (300% strain) of 270 psi; a tensile strength at break (Die C, 20 in/min) via ASTM D412 of 700 psi; a tensile elongation at break (Die C, 20 in/min) via ASTM D412 of 600%; a tear strength (Die C, 20 in/min) via ASTM D624 of 135 lbf/in; and a durometer hardness via ASTM D2240-Shore A, 1 sec, injection molded is 32; and Shore A, 5 sec, injection molded is 30. While this compound has a suitable Shore A property set for the sole/lower portion, no definitive determination of this compound's abrasion resistance is available.

Teknor Apex Co. Monprene® SP-15930 XRD1 has the following general processing parameters when using a suitable injection molding machine (e.g., a 50 ton, a 100 ton, a 200 ton, a 300 ton, or even an injection molding machine having a "higher" amount of tonnage): a rear temperature of about 350° F. to about 390° F.; a middle temperature of about 390° F. to about 420° F.; a front temperature of about 400° F. to about 430° F.; a nozzle temperature of about 390° F. to about 430° F.; a processing (melt) temperature of about 390° F. to about 430° F.; a mold temperature of about 80° F. to about to 120° F.; an injection rate that is stated to be moderate-fast; a back pressure of about 25.0 psi to about 100 psi; a screw speed of about 50 rpm to about 100 rpm; and a cushion of about 0.150 inches to about 1.00 inches. Drying is necessary prior to molding the Monprene® SP-15930 XRD1 and should be done for about 4 hours at about 150° F. (about 65° C.). Extrusion parameters are generally as follows for the Monprene® SP-15930 XRD1: cylinder zone 1 Temperature is about 350° F. to about 390° F.; cylinder zone 2 Temperature is about 390° F. to about 410° F.; cylinder zone 3 Temperature is about 390° F. to about 410° F.; cylinder zone 4 Temperature is about 400° F. to about 420° F.; and die temperature is about 390° F. to about 420° F.

It should be noted that the present invention is not limited to just the above mentioned polymer, but rather can use any polymer composition that meets one or more of the various chemical and/or physical properties detailed above for the sole/lower portion. As noted above suitable thermoplastic elastomer polymers and/or thermoplastic rubbers include, but are not limited to, one or more styrene-butadiene polymers, one or more styrene-butadiene block copolymers, one or more styrene-butadiene polymer-mineral oil combinations, one or more styrene-butadiene block copolymer-mineral oil combinations, one or more styrene-butadiene polymer-silicone oil combinations, one or more styrene-butadiene block copolymer-silicone oil combinations, or one or more styrene block copolymers (including, but not limited to, any type of thermoplastic elastomer polymers and/or thermoplastic rubbers made from a styrene blocks with any one or more other suitable polymer blocks regardless of whether such other blocks are styrenic in nature or not), or any suitable combination of two or more of the above. In one instance, the sole/lower portion polymer material is selected from a suitable thermoplastic elastomer polymers and/or thermoplastic rubbers including, but not limited to, a styrene block copolymer such as a styrene-butadiene-styrene block copolymer which can optionally further include one or more of mineral oil and/or a silicone oil. In one more detailed instance, the sole/lower polymer material is selected from a suitable thermoplastic elastomer polymers and/or thermoplastic rubbers including, but not limited to, a styrene block copolymer such as a styrene-butadiene-styrene block copolymer, which can optionally further include one or more of mineral oil and/or a silicone oil, or a styrene-ethylene-butylene-styrene (SEBS) copolymer (SEBS may be referred to as a triblock copolymer due to the general appreciation of ethylene and butylene blocks as one block where such polymer compounds exhibit both thermoplastic and elastomeric properties and/or both thermoplastic and rubber properties), which can optionally further include either a mineral oil or a silicone oil.

In still another embodiment, the upper portion of the present invention can be cast, molded, injected or extruded in any manner and in any shape and then can be subsequently formed into a desired upper shoe shape by radio frequency welding, ultrasonic welding or any other type of polymer to polymer welding process of one or more "seams" to form the desired upper shape. Various radio frequency welding techniques for polymers, and in particular, thermoplastic elastomer polymers and/or thermoplastic rubbers are known to those of skill in the art including, but not limited to, those processes available from Genesis Plastics Welding of Indiana, USA. In another embodiment, the upper portion of the present invention can be formed from any suitable process described above and then attached to a suitable formed sole/lower portion (also formed according to any of the processes discussed above) via radio frequency welding, ultrasonic welding or any other type of polymer to polymer welding process.

In one embodiment, the polymer compound utilized in the present invention can be of any color or shade and is not limited to any one color or shade. In such an instance where a colorized product is desired, one or more colorants or color additives can be used in either one, or both, of the upper portion and/or the sole/lower portion of the present invention. In still another embodiment, any other desirable additives can be added to the polymers utilized to produce either one, or both, of the upper portion and the sole/lower portion. Such additives include, but are not limited to, UV stabilizers, polymer processing aids, colorants, thickeners, strengtheners, etc.

Additionally, it should be noted that the above processing parameters are exemplary in nature and can be modified, if needed, when using a different type of manufacturing process and/or manufacturing machine. It should be noted that as used herein the phrase "protective shoe cover" is not to be construed as limited to only protecting shoes, but can be designed to protect virtually any type or kind of footwear.

In still another instance, any one or more suitable thermoplastic elastomer polymers and/or thermoplastic rubbers, or any combination thereof, that are compostable and/or biodegradable can be utilized in connection with the present invention (be it the dip molding embodiments and/or the injection molding or other molding process embodiments). In still another embodiment, any one or more suitable biodegradable thermoplastic elastomer polymers and/or thermoplastic rubbers, or any combination thereof, can be combined with any one or more other bioplastics to achieve any number of desired performance properties. As is known in the art, bioplastics are plastics derived from renewable biomass sources, such as vegetable fats and oils, corn starch, straw, woodchips, food waste, etc. Bioplastic can be made from agricultural by-products and also from used plastic bottles and other containers using microorganisms.

As would be apparent, the protective shoe coverings of the present invention can be of any suitable geometric design or shape so that the protective shoe coverings of the present invention can be placed over or "put-on" any type of shoe or other footwear. In one instance, the protective shoe covering of the present invention has formed thereon at least one opening at the top area thereof corresponding to where a shoe or other footwear has an opening for a wear's foot. In another instance, the protective shoe covering of the present invention has at least two openings therein, one opening at the top area thereof corresponding to where a shoe or other footwear has an opening for a wear's foot, and a second opening for a heel portion of the shoe or other footwear in such cases where such a shoe or other footwear has a distinctive heel.

In another embodiment, the present invention relates to a protective shoe covering that is formed from any suitable molding (e.g., injection molding) process and/or any suitable dipping method where such a suitable process yields a protective shoe covering formed from any one or more upper polymer materials disclosed above that not only has an upper shoe portion but has a suitably thick bottom layer that covers the bottom of a desired shoe and/or footwear item. In this instance, such a bottom is generally not suitable for extended wear and/or outdoor wear as it is formed from the upper polymer material.

While not limited thereto, in one embodiment the thickness of the upper portion of the protective shoe covering of the present invention is in the range of from about 0.035 inches to about 0.05 inches, or from about 0.036 inches to about 0.049 inches, or from about 0.037 inches to about 0.048 inches, or from about 0.038 inches to about 0.047 inches, or from about 0.039 inches to about 0.046 inches, or from about 0.04 inches to about 0.045 inches, or from about 0.041 inches to about 0.044 inches, or from about 0.042 inches to about 0.043 inches, or even about 0.0425 inches. Here, as well as elsewhere in the specification and claims, individual numerical values can be combined to form additional and/or non-disclosed ranges. It should be noted that the above thickness ranges for the upper portion of the protective shoe covering of the present invention are exemplary in nature and the present invention is not limited thereto. It should be noted that in the instance where the present invention is directed to a shoe protective shoe covering that is primarily designed for indoor use only, the sole/lower portion described below is not present and the thickness of the bottom surface of the protective shoe covering falls within the ranges stated above for the upper portion.

While not limited thereto, in one embodiment the minimum thickness of the sole/lower portion of the protective shoe covering of the present invention is in the range of from about 0.05 inches to about 0.1 inches, or from about 0.055 inches to about 0.095 inches, or from about 0.06 inches to about 0.09 inches, or from about 0.065 inches to about 0.085 inches, or from about 0.07 inches to about 0.08 inches, or even about 0.075 inches. Here, as well as elsewhere in the specification and claims, individual numerical values can be combined to form additional and/or non-disclosed ranges. As would be apparent, if there is a tread pattern on the sole/lower portion, such one or more tread pattern portions could be much thicker. In one embodiment, where there is one or more tread pattern portions on the lower surface of the sole/lower portion of the protective shoe covering of the present invention, the thickness of the sole/lower portion in these one or more areas is in the range of from about 0.08 inches to about 0.13 inches, or from about 0.085 inches to about 0.125 inches, or from about 0.09 inches to about 0.12 inches, or from about 0.095 inches to about 0.115 inches, or from about 0.1 inches to about 0.11 inches, or even about 0.105 inches. Here, as well as elsewhere in the specification and claims, individual numerical values can be combined to form additional and/or non-disclosed ranges. Also, it should be noted that the above thickness ranges for the various portions of the sole/lower portion of the protective shoe covering of the present invention are exemplary in nature and the present invention is not limited thereto.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

The invention claimed is:

1. A polymer article comprising:
   a first portion formed from a first thermoplastic polymer compound, wherein the first thermoplastic polymer compound is a first thermoplastic elastomer polymer compound that is selected from at least one of a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, a styrene-butadiene-styrene block copolymer, a styrene-butadiene-styrene block copolymer-mineral oil combination, or a styrene-butadiene-styrene block copolymer-silicone oil combination, and wherein the first thermoplastic elastomer polymer compound has both: (i) an elongation of greater than about 800 percent; and (ii) a tensile modulus at 300 percent in the range of about 20 psi to about 100 psi; and
   at least one second portion formed from a second thermoplastic polymer compound, wherein the second thermoplastic polymer compound is a second thermoplastic elastomer polymer compound that is selected from at least one of a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, a styrene-butadiene-styrene block copolymer, a styrene-butadiene-styrene block copolymer-mineral oil combination, a styrene-butadiene-styrene block copolymer-silicone oil combination, a styrene-ethylene-butylene-styrene copolymer, a styrene-ethylene-butylene-styrene copolymer-mineral oil combination, or a styrene-ethylene-butylene-styrene copolymer-silicone oil combination, and wherein the second thermoplastic elastomer polymer compound has both: (a) an abrasion resistance in the range of about 50 mg loss/1000 cycles to about 750 mg loss/1000 cycles; and (b) a Shore A value in the range of about 25 and about 42,
   wherein the at least one second portion is bonded to the first portion,
   wherein the first thermoplastic elastomer polymer compound and the second thermoplastic elastomer polymer compound provide both flexibility and conformability to the polymer article, and
   wherein the polymer article is formed solely from the first thermoplastic polymer compound and the second thermoplastic polymer compound and is a protective shoe covering that is worn over a piece of footwear and has the ability to be removed and replaced on the footwear multiple times.

2. The polymer article of claim 1, wherein the first thermoplastic elastomer polymer compound has an elongation of greater than 850 percent.

3. The polymer article of claim 1, wherein the first thermoplastic elastomer polymer compound has a tensile modulus at 300 percent in the range of about 22 psi to about 98 psi.

4. The polymer article of claim 1, wherein the second thermoplastic elastomer polymer compound has an abrasion resistance in the range of about 200 mg loss/1000 cycles to about 600 mg loss/1000 cycles.

5. The polymer article of claim 1, wherein the second thermoplastic elastomer polymer compound has a Shore A value in the range of about 28 and about 40.

6. The polymer article of claim 1, wherein either the first thermoplastic elastomer polymer compound and/or the second thermoplastic elastomer polymer compound each individually further comprise one or more UV stabilizers, one or more polymer processing aids, one or more colorants, one or more thickeners, one or more strengtheners, or any suitable combination of two or more thereof.

7. The polymer article of claim 1, wherein either the first thermoplastic elastomer polymer compound and/or the second thermoplastic elastomer polymer compound each individually are optically clear to an unaided human eye of average vision.

8. A polymer article comprising:
a first portion formed from a first thermoplastic polymer compound, wherein the first thermoplastic polymer compound is a first thermoplastic elastomer polymer compound that is selected from at least one of a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, a styrene-butadiene-styrene block copolymer, a styrene-butadiene-styrene block copolymer-mineral oil combination, or a styrene-butadiene-styrene block copolymer-silicone oil combination, and wherein the first thermoplastic elastomer polymer compound has both: (i) an elongation of greater than about 850 percent; and (ii) a tensile modulus at 300 percent in the range of about 20 psi to about 70 psi; and
at least one second portion formed from a second thermoplastic polymer compound, wherein the second thermoplastic polymer compound is a second thermoplastic elastomer polymer compound that is selected from at least one of a styrene-butadiene polymer, a styrene-butadiene block copolymer, a styrene-butadiene polymer-mineral oil combination, a styrene-butadiene block copolymer-mineral oil combination, a styrene-butadiene polymer-silicone oil combination, a styrene-butadiene block copolymer-silicone oil combination, a styrene-butadiene-styrene block copolymer, a styrene-butadiene-styrene block copolymer-mineral oil combination, a styrene-butadiene-styrene block copolymer-silicone oil combination, a styrene-ethylene-butylene-styrene copolymer, a styrene-ethylene-butylene-styrene copolymer-mineral oil combination, or a styrene-ethylene-butylene-styrene copolymer-silicone oil combination, and wherein the second thermoplastic elastomer polymer compound has both: (a) an abrasion resistance in the range of about 100 mg loss/1000 cycles to about 700 mg loss/1000 cycles; and (b) a Shore A value in the range of about 26 and about 41,
wherein the at least one second portion is bonded to the first portion,
wherein the first thermoplastic elastomer polymer compound and the second thermoplastic elastomer polymer compound provide both flexibility and conformability to the polymer article, and
wherein the polymer article is formed solely from the first thermoplastic polymer compound and the second thermoplastic polymer compound and is a protective shoe covering that is worn over a piece of footwear and has the ability to be removed and replaced on the footwear multiple times.

9. The polymer article of claim 8, wherein the first thermoplastic elastomer polymer compound has an elongation of greater than 900 percent.

10. The polymer article of claim 8, wherein the first thermoplastic elastomer polymer compound has a tensile modulus at 300 percent in the range of about 22 psi to about 68 psi.

11. The polymer article of claim 8, wherein the second thermoplastic elastomer polymer compound has an abrasion resistance in the range of about 200 mg loss/1000 cycles to about 600 mg loss/1000 cycles.

12. The polymer article of claim 8, wherein the second thermoplastic elastomer polymer compound has a Shore A value in the range of about 28 and about 40.

13. The polymer article of claim 8, wherein either the first thermoplastic elastomer polymer compound and/or the second thermoplastic elastomer polymer compound each individually further comprise one or more UV stabilizers, one or more polymer processing aids, one or more colorants, one or more thickeners, one or more strengtheners, or any suitable combination of two or more thereof.

14. The polymer article of claim 8, wherein either the first thermoplastic elastomer polymer compound and/or the second thermoplastic elastomer polymer compound each individually are optically clear to an unaided human eye of average vision.

* * * * *